United States Patent [19]

Markland

[11] 3,976,475
[45] Aug. 24, 1976

[54] PROCESS FOR THE RECOVERY OF TANTALUM AND/OR NIOBIUM FROM ACID SOLUTIONS THEREOF

[75] Inventor: Svend Aage Markland, Follenslev, Denmark

[73] Assignee: Atomenergikommissionen, Denmark

[22] Filed: Aug. 20, 1975

[21] Appl. No.: 606,380

[30] Foreign Application Priority Data
Aug. 22, 1974  Denmark .............................. 4490/74

[52] U.S. Cl. ........................ 75/101 BE; 75/101 R; 75/121; 423/63
[51] Int. Cl.² .......................................... C22B 34/24
[58] Field of Search ....... 423/63; 75/101 BE, 121 R, 75/101 R

[56] References Cited
UNITED STATES PATENTS

| | | |
|---|---|---|
| 2,927,855 | 3/1960 | Keller et al. .......................... 75/121 |
| 2,950,966 | 8/1960 | Foos ..................................... 75/121 |
| 2,953,453 | 9/1960 | Foos ..................................... 75/121 |
| 3,051,547 | 8/1962 | Bielecki ......................... 75/101 R X |
| 3,065,046 | 11/1962 | Foos et al. .............................. 423/63 |
| 3,117,833 | 1/1964 | Pierret ................................... 423/63 |
| 3,712,939 | 1/1973 | Capps et al. ........................... 423/63 |

*Primary Examiner*—G. Ozaki
*Attorney, Agent, or Firm*—Beveridge, DeGrandi, Kline & Lunsford

[57] ABSTRACT

The invention is concerned with the recovery and separation of tantalum and/or niobium from a solution of these elements in aqueous mineral acid, preferably sulfuric acid. The element or elements is/are extracted from the acid solution thereof by means of an amine, preferably a tertiary, long-chained alkyl amine, in the presence of hydrogen peroxide and of fluoride ions. Thereby the extraction and separation can be performed effectively at comparatively low acid concentration, normally below a concentration of 4N.

8 Claims, 6 Drawing Figures

PROCESS FOR THE RECOVERY OF TANTALUM AND/OR NIOBIUM FROM ACID SOLUTIONS THEREOF

Tantalum and niobium normally are found together in various minerals which are of importance for the industrial recovery of tantalum and niobium in the form of metal or in the form of chemical compounds of these elements. Examples of some of the most important of these minerals are columbite, tantalite, pyrochlore, microlite and loparite.

The said two elements possess very closely related chemical properties and it has, therefore, been difficult to find suitable industrial methods for the recovery and separation of these elements, i.e. methods which are effective with regard to recovery and separation and at the same time are relatively uncomplicated and inexpensive as well as without risks.

It is to be noted that when here and in the following description use is made of terms such as "recovery of tantalum", "recovery of niobium", "tantalum-containing", "niobium-containing" and the like I refer to these elements independent of their actual valency. Thus, "recovery of tantalum and/or niobium" does not necessarily mean recovery of these elements in the form of metal, but may as well mean recovery in the form of some suitable chemical compounds.

In recent years it has been proposed to use various extraction methods for the recovery and separation of the said two elements form aqueous, acid solutions thereof. The extraction method which has gained the greatest success in practice, and which is used almost exclusively, consists in the extraction of an aqueous tantalum- and niobium-containing solution containing hydrofluoric acid and possibly sulfuric acid in high concentration , use being made of methylisobutylketone (MIBK) as extractant. According to circumstances the extraction conditions can be so selected that a substantial separation is obtained already the first time an extraction is performed, so that the substantial part of tantalum is transferred to the extract in a relatively pure form, while the substantial part of niobium remains in the raffinate. With a view to obtain such result one has, by way of example, extracted solutions of tantalum and niobium in a 7N HF-solution by means of MIBK, whereby niobium remains in the raffinate, while tantalum may be recovered from the organic extract by precipitation by the addition of an aqueous KF-solution, the tantalum thereby being precipitated in the form of $K_2TaF_7$. However, when both elements are to be recovered, it is common practice to perform the extraction at a sulfuric acid-concentration so high that not only all the tantalum, but also most of the niobium is transferred to the extract, which is then subjected to a back-wash by means of diluted sulfuric acid so as to remove niobium. These extractions and back-washes may, if so desired, be repeated in known manner so as to secure complete separation. From the ultimate solution of tantalum and niobium, respectively, these elements can be precipitated in the form of $K_2TaF_7$ and $K_3NbOF_6$, respectively, by the addition of an aqueous KF-solution. In the solution to be extracted by means of the latter process, use is made of acid concentrations as high as about 7N hydrofluoric acid and about 10N sulfuric acid.

Even if the said extraction method (described, for example, in "Chemistry and Industry", April, 1967, pages 613–615) has been considered to be especially suited for the industrial recovery and separation of tantalum and niobium, it is nevertheless possessed of several disadvantages. Thus, the very high acid concentrations give rise to serious corrosion problems, and furthermore extensive security measures are required, especially on account of the very high concentration of hydrofluoric acid, in order to protect the persons working with the extraction method. Furthermore, methylisobutylketone possesses a relatively high solubility in water, which reduces the separation efficiency and also gives rise to serious difficulties on account of the waste water from the processing plant.

It has also been proposed to recover and separate tantalum and niobium by extraction from an aqueous solution of hydrofluoric acid by means of an amine, such as trioctylamine, but also in this case it is necessary to use a relatively high concentration of fluoric acid in view of the separation effect. Moreover, it has been proposed to subject a sulfuric acid solution of tantalum and niobium to an extraction, and also to subject a sulfuric acid solution of tantalum and niobium and hydrogen peroxide to an extraction, by means of an amine such as trioctylamine, but also in these cases use is made of starting solutions of high acid concentrations in order to obtain only a fairly good extraction and separation effect. In the said cases of extraction by means of an amine, use is made, as practically always in such cases, of a solution of the amine in an organic solvent immiscible or relatively immiscible with the aqueous phase, preferably a hydrocarbon, such as an aliphatic, aromatic or araliphatic hydrocarbon, carbon tetrachloride or the like.

I have now found that it is possible to recover and to separate tantalum and niobium effectively and in simple manner by extraction by means of an amine from aqueous acid solutions thereof having relatively low acid concentration, in such manner that the above-mentioned disadvantages can be avoided or at least can be essentially reduced.

Accordingly, the process of the invention, by which this becomes possible, aims at the recovery of tantalum and/or niobium from aqueous, mineral acid-containing, preferably sulfuric acid-containing, solutions containing these metals by extraction in one or more steps by means of an amine, preferably a tertiary, long-chained alkyl amine, and in the presence of hydrogen peroxide. The novel and characteristic feature of the process of the invention consists in that the extraction of the acid, hydrogen peroxide-containing solution by means of the amine is performed in the presence of fluoride ions.

The invention is most easily understood by means of the following explanation of some investigations concerning the influence of the variation of concentration of hydrogen peroxide, mineral acid (sulfuric acid), fluoride ion, amine and of tantalum and niobium on the extraction and separation of tantalum and niobium. In this explanation reference is made to the attached drawing.

Furthermore, in FIG. 6 is shown diagrammatically, in a flow-sheet, an example of the performance in practice of the process of the invention.

In all the experiments resulting in the FIGS. 1–3 and 5 a sulfuric acid solution of tantalum and niobium is extracted by means of a solution of 7.5 vol% commercial trioctylamine in Solvesso 100 (where "Solvesso" is a registered trade mark). "Solvesso 100" is an aromatic hydrocarbon fraction which is stated to contain about 93% methylethylbenzene and trimethylbenzene isomers as well as about 3% $C_{10}$ - and less than 1% $C_8$ -and $C_{11}$ - hydrocarbons. In experiment No. 4 extractions were made as above stated at varying concentrations of amine. In all the expriments a phase-ratio of 1:1 was used between the solution to be extracted and the amine solution used for the extraction.

The tantalum- and niobium-containing solution used in the said experiment was prepared from hydrated oxides of tantalum and niobium, said oxides being dissolved in a mixture of sulfuric acid and hydrogen peroxide, while slowly heating up to about 60°C. The said hydrated oxides were prepaed by caustic fusion of tantalum and niobium pentoxides at a temperature of from 600°–800°C, whereupon the cooled and ground melt by means of water was washed free of excessive alkali and of silicate, neutralized with sulfuric acid and filtered. The material filtered off consists of the said hydrated oxides.

In the experiments carried out, fluoride was added to the solution to be extracted ("feed solution") prior to the performance of the extraction, but in principle it is very well possible to introduce the fluoride simultaneously with, if so desired in mixture with, the extractant. The feed solutions prepared were stable for several months without any occurrence of precipitations of hydrolized tantalum and niobium compounds.

The concentrations of tantalum and niobium were determined by spectro-photometric methods. As far as niobium is concerned use was made of the so-called thiocyanate-acetone method, while tantalum was determined by means of a Nilblau A complex (E. Gagliardi and E. Wolf, Mikrochimica Acta, Wien, 1969, 4, 888).

In experiment No. 1 (cf. FIG. 1) the solutions to be extracted (the feed solutions) contained 0.081M Nb, 0.0045M Ta, 0.081M $F^-$ and 0.16M $H_2O_2$. It will be seen that at a sulfuric acid concentration of only about 0.5M a very high separation (a separation factor of the order of about 250) is obtained.

In experiment No. 2 (cf. FIG. 2) the feed solutions contained 0.081M Nb, 0.0045M Ta, 0.081M $F^-$ and 1.8M $H_2SO_4$. The feed solutions prepared contained as minimum concentration of $H_2O_2$ a $H_2O_2$-amount corresponding to the mole-radio 1:1 for Nb:$H_2O_2$ and Ta:$H_2O_2$. This concentration corresponds to 0.01M $H_2O_2$ in experiment No. 2. From FIG. 2 it will be seen that variation in the $H_2O_2$-concentration above this minimum concentration has only little influence on the separation of tantalum and niobium, which is also a reflection of the circumstance that great $H_2O_2$-amounts are required to introduce more than one molecule of $H_2O_2$ in the metal complexes.

In experiment No. 3 (cf. FIG. 3) the feed solutions contained 0.081M Nb, 0.0045M Ta, 0.16M $H_2O_2$ and 1.8M $H_2SO_4$.

Figure 1:
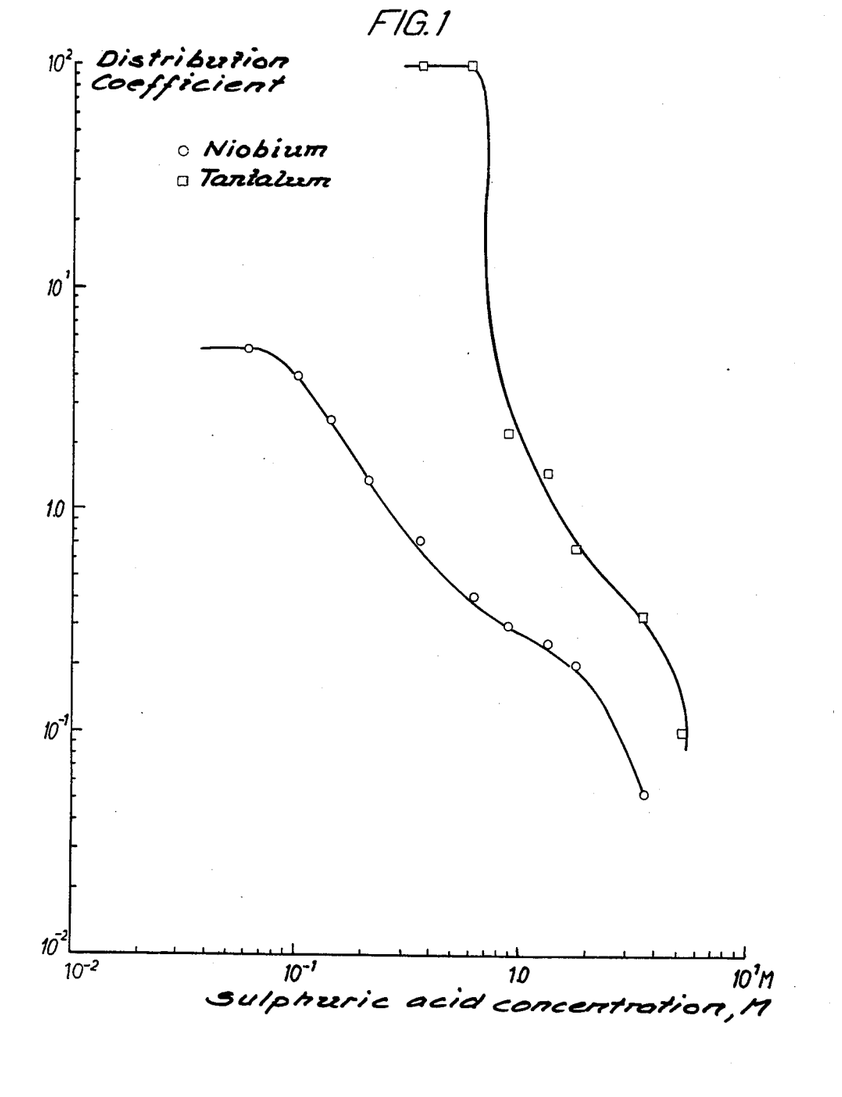
In FIG. 1 is shown the influence of varying concentrations of sulfuric acid on the distribution coefficients for tantalum and niobium, the other mentioned variables being maintained constant.
Figure 2:
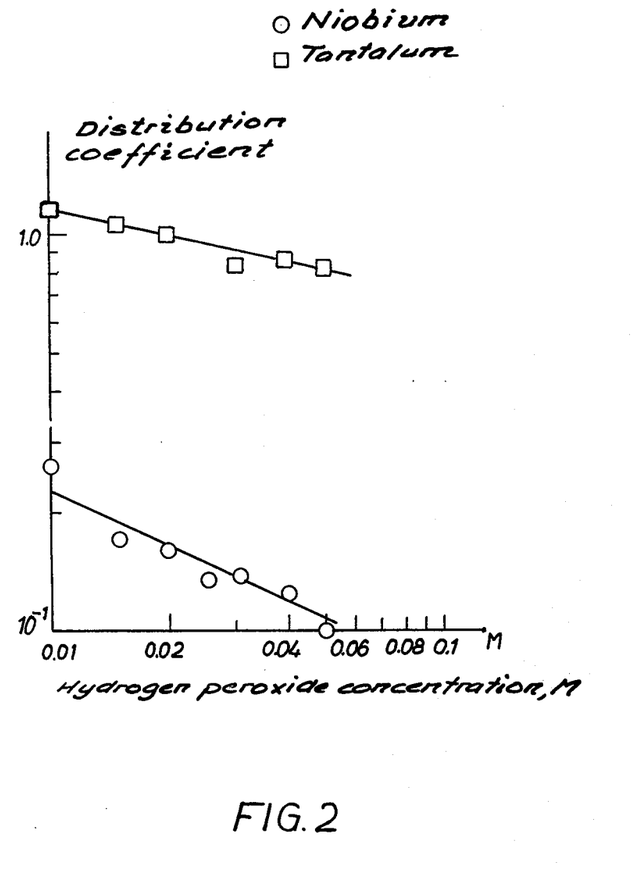
In FIG. 2 is shown the influence of varying concentrations of hydrogen peroxide on the distribution coefficients for tantalum and niobium, the other mentioned variables being maintained constant.
Figure 3:
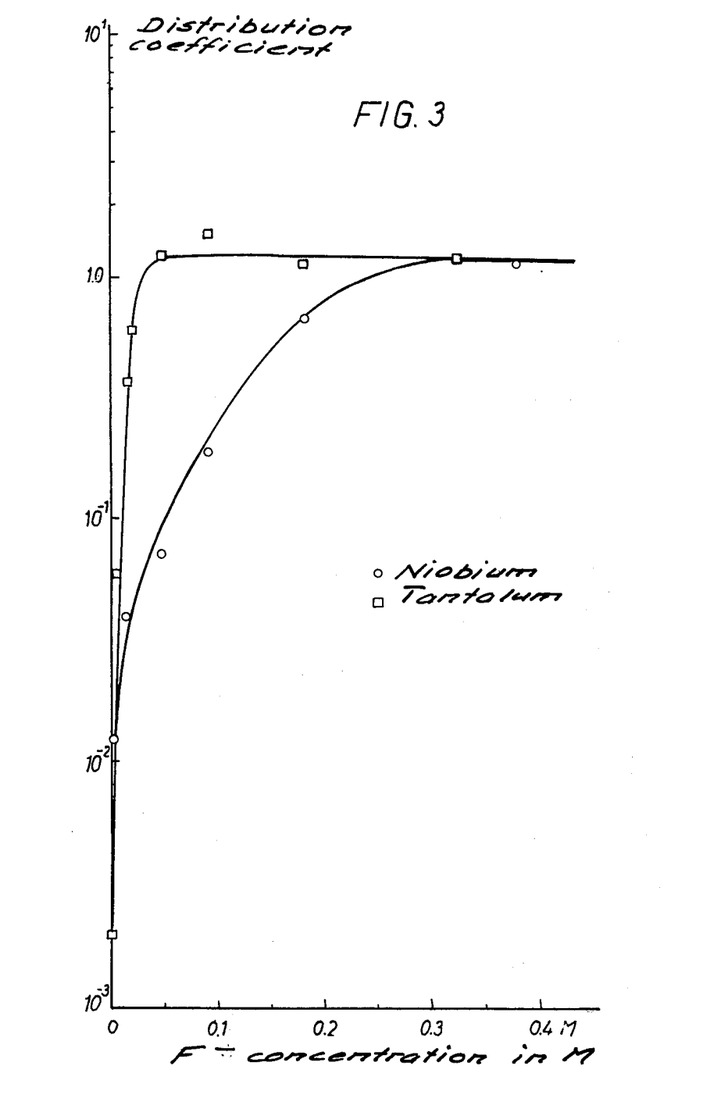
In FIG. 3 is shown the influence of varying concentrations of fluoride ions on the distribution coefficients for tantalum and niobum, the other mentioned variables being maintained constant.

From FIG. 3 is seen the interesting circumstance that at low fluoride concentrations practically only tantalum is extracted, and that the maximum extraction of tantalum is obtained already at low fluoride concentrations. Maximum extraction of Ta is obtained already at so low $F^-$-concentration as corresponds to 4M $F^-$ per mole Ta. Furthermore, it will be seen that an increase in fluoride concentration increases the extraction of niobium until a fluoride concentration of a little above 0.3M is obtained, corresponding to about 4 moles $F^-$ per mole Ta plus Nb. In other words, these circumstances mean that at low fluoride concentrations a very high separation factor is obtainable.

In experiment No. 4 (cf. FIG. 4) the feed solutions contained 0.081M Nb, 0.0045M Ta, 0.16M $H_2O_2$, 0.081M $F^-$ and 1.8M $H_2SO_4$.

Figure 4:
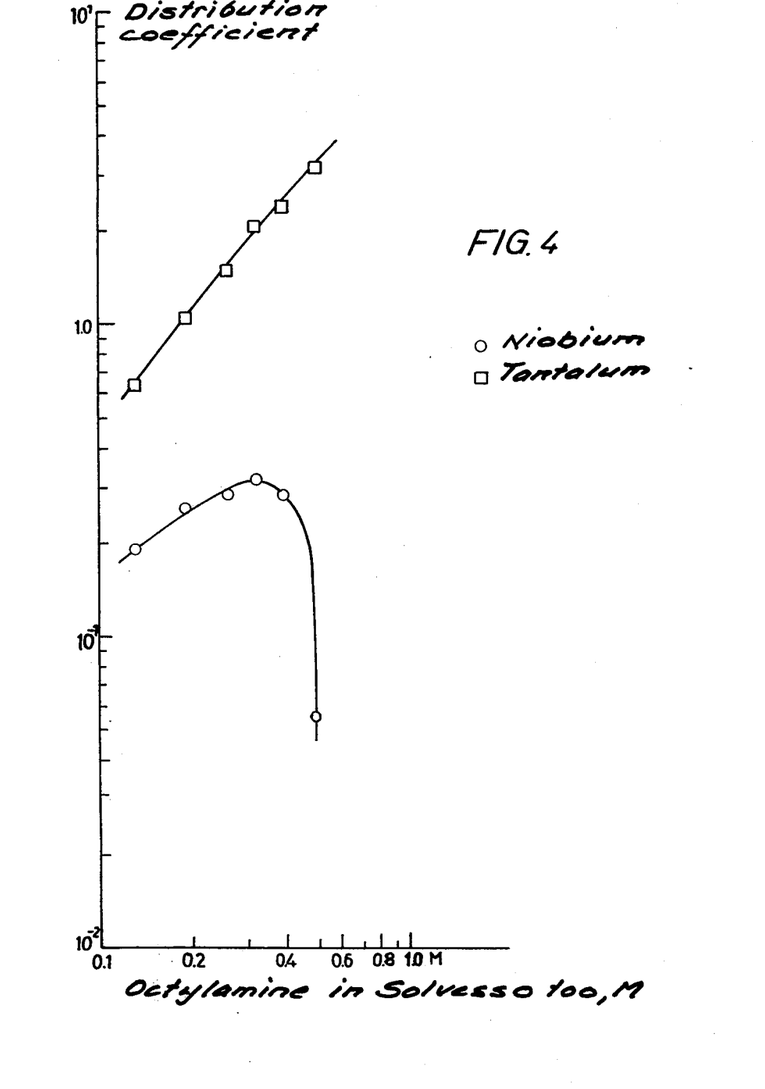
In FIG. 4 is shown the influence of varying amine concentrations on the distributions coefficients for tantalum and niobium, the other mentioned variables being maintained constant.

From FIG. 4 it will be seen that the extracted amount of tantalum is directly proportional to the amine concentration, whereas this is not the case as far as niobium is concerned. The curve for niobium is strongly curved with a maximum at an amine concentration of about 0.3M, corresponding to about 15 vol% amine.

In this case (experiment No. 4) only about 20% of the amount of fluoride required for complete extraction of niobium (cf. experiment No. 3) has been added. At high amine concentrations hydrolysis of fluoride-free niobium in the aqueous phase will result in a change in equlibrium and in a reduction of the distribution coefficient for niobium.

In experiment No. 5 (cf. FIG. 5) the feed solutions contained 0.081M $F^-$, 0.16M $H_2O_2$ and 1.8M $H_2SO_4$.

Figure 5:
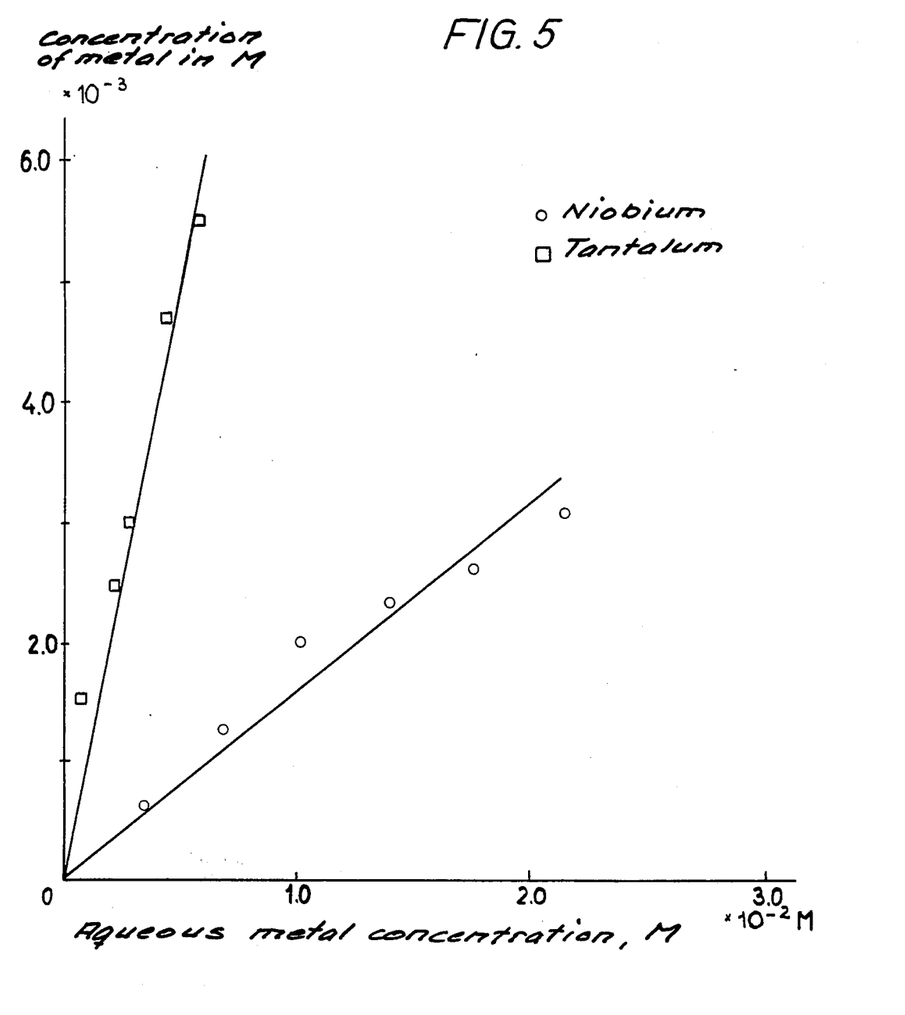
In FIG. 5 is shown the extraction of tantalum an niobium at varying concentrations of these metals, the other mentioned variables being maintained constant.

It will be seen from FIG. 5 that for tantalum as well as for niobium there is a linear relationship, which means that the extracted amount of tantalum and niobium is directly proportional to the concentration of tantalum and niobium, respectively, in the feed solution.

It will be seen from the above-mentioned experiments, the results of which have been confirmed by extractions under actual conditions in practice, that the mineral acid concentration can easily be kept below, and even substantial below, a concentration corresponding to 10N, and it is preferably kept in the ranges from 0.2N to 4N. Normally, it will be best to maintain the concentration in the range from 0.4N to 2N. While these statements of concentrations are especially well suited for sulfuric acid solutions, they are also applicable, where other mineral acids will be used, especially $HNO_3$ and HCl.

With respect to the amount of hydrogen peroxide to be incorporated into the solution to be extracted, one should, as will appear from the preceding text, preferably incorporate an amount of hydrogen peroxide, which is at or in the neighbourhood of the amount required to convert the Ta- and Nb-compounds into complexes containing one molecule of $H_2O_2$ for each Ta- and Nb-atom. Sone deviation from this amount can be tolerated, but an addition, by way of example, of greater amounts of hydrogen peroxide results normally in a reduced extraction of both Ta- and Nb-compounds, even if in return the separation shows some inclination to become a little greater.

With respect to the fluoride concentration, this has, as will appear from the preceding text an essential influence on the extraction of tantalum and niobium, and increasing fluoride concentration results in an increasing extraction, up to a certain limit, of tantalum and niobium, but the increases for tantalum and niobium at the various fluoride concentrations are different. In some cases it may be advantageous to use a fluoride concentration, which does not substantially exceed the concentration, at which (under the extraction conditions incidentally used) a maximum extraction of tantalum as well as niobium is obtained (cf. FIG. 3). In that case, the said extraction can be followed, if so desired, by a separation by back-washing of niobium from the extract by means of diluted mineral acid such as diluted sulfuric acid, as later on explained. The presence of fluoride ions as well as hydrogen peroxide molecules in the solution to be extracted is supposed to result in the formation of complexes of the type $MeO(H_2O_2)F_4^-$, wherein Me = Ta or Nb, and by extraction of the aqueous solution by means of, for example trioctylamine, the metal compound is supposed to be extracted in the form of a complex of the type $R_3NHMeO(H_2O_2)F_4$, wherein R = octyl. Although this explanation is believed to be the true one, I do not wish to be restricted to this explanation. In other cases, it will be preferred to use in the extraction procedure a fluoride concentration, at which maximum or almost maximum extraction of tantalum is obtained, while at the same time a substantially less than maximum extraction of niobium is obtained, so that already in the first extraction there is obtained a substantial separation of tantalum and niobium. The greatest separation can normally be obtained by the use of a fluoride concentration at or in the neighbourhood of the concentration, which just secures maximum extraction of tantalum. In FIG. 3 this concentration is about 0.05M.

The ultimate recovery of Ta and Nb from the solutions obtained by such extractions may be performed in known manner as will be mentioned in the following.

The fluoride ions can in various ways be incorporated into the acid solutions to be extracted, in the most simple manner by the addition of any fluoride salt which is soluble in the acid feed solution, as for example ammonium fluoride or an alkali metal fluoride, preferably potassium fluoride or sodium fluoride, but it is also possible to use an addition of hydrofluoric acid. The added fluoride salt naturally should not contain atoms or atomic groups or compounds, which in a disturbing manner interfere with the extraction process, for example, by the formation of disturbing complexes of niobium or tantalum.

With respect to the nature of the amine used in the extraction, and the manner in which it is used in the extraction substantially the same applies as in the known extraction of metals, such as Zr and Hf, by means of an amine, and in this connection reference is made to the technical literature, as for instance "Solvent Extraction", Proceedings of the International Solvent Extraction Conference, ISEC 71, Haag 19–23 Apr. 1971, Volume II, Pages 1131–1133. Furthermore, reference is made to the information concerning extraction of zirconium by means of an amine, given in the Danish patent specification No. 128,288. Just as is stated in the said specification, there is also in the present case for the extraction preferably used a solution of the amine in a medium, which is substantially immiscible with the acid solution and substantially chemically inert in the extraction. Examples of such media are hydrocarbons as already mentioned in the preceding text. As such hydrocarbons can be used aliphatic as well as araliphatic or aromatic hydrocarbons, but it is preferred to use benzene-hydrocarbons, and first and foremost alkylbenzene-hydrocarbons, as for instance the previously mentioned Solvesso 100. The amine concentration in the solvent as used is determined with a view to the concentration of tantalum and niobium in the solution to be extracted, as well as with a view to the desired separation between Ta and Nb (cf. FIG. 4) and with a view to the phase-ratio, which one desires to use in the particular case to be considered. Naturally, this phase-ratio is not necessarily 1:1 as in the experiments referred to in the preceding text.

In principle nothing is to prevent the use of the pure amine (i.e. without any solvent) for the extraction, whereby the amine will also function as the organic solvent phase for the extracted metal. However, such embodiment of the process of the invention is not favorable, partly for economical reasons, partly because the amine to be used normally is too viscid. It should be further mentioned, in connection with this amine concentration to be used, that there is apparently a tendency to a better separation between tantalum and niobium at increasing amine concentration, also at amine concentrations below the one corresponding to the maximum on the niobium-curve in FIG. 4. Naturally, increasing amine concentration in experiment No. 4 is tantamount to a greater amine concentration in the total extraction system in relation to the Ta- and Nb-concentration. As a matter of course, greater or less amount of amine in the total extraction system in proportion to the Ta- and Nb-amounts present is not necessarily provided by providing a greater or less amine concentration in the extractant as used, but can be provided by changing the previously mentioned phase-ratio.

In practice the phase-ratio (i.e. the ratio of volumes) between feed solution and extractant solution will normally be within the range from 5:1 to 1:5, and mostly will be within the range frm 3:1 to 1:3. A phase-ratio between 2:1 and 1:2, for example about 1:1, will most often be considered suitable, in particular also with a view to the avoidance of excessive increase of the total volume of liquid by the addition of the extractant solution to the feed solution.

As to the amines used in the extraction, the same amines can be used as in the known procedure of extraction of metals such as Zr and Hf. Such amines are first and foremost secondary or tertiary alkyl amines possessing relatively long alkyl chains, which may also contain substituents or heteroatoms. The use of similar, primary amines is not excluded, but as mentioned use is made first and foremost of long-chained tertiary and secondary alkylamines, preferably such amines having alkyl chains containing from 6 to 12 carbon atoms. One of the amines used most extensively in practice is trioctylamine, also referred to in the experiments mentioned in the preceding text, but one could just as well use, for example, tricaprylamine. Furthermore, it is also possible, at least in some cases, to use, for example, basic anion exchangers such as, for example, Amberlite IR-45 or Amberlite IRA-410 (manufactured by Rohm and Haas, U.S.A.).

In the extraction process of the invention tantalum will in practice at low acid concentrations normally be easier extractable than niobium (cf. FIG. 1), and in practice it is often possible already in the first extraction to obtain high separation factors (cf. FIG. 3). However, according to the nature of the starting material, i.e. the ratio between concentrations of tantalum and niobium, the nature of other substances present (as for example Zr, Hf, Ti), and the concentration of such substances in relation to the concentration of tantalum and niobium, it may sometimes in practice be necessary or at least recommendable to perform the extraction in more than one step, in a manner which is already known per se, while using re-extractions and back-washes with a view to securing the most complete separation. As an example of a multistep-extraction system, which can be used for the performance of the process of the invention in several steps, I may mention the plant for extraction in several steps, manufactured by Murex Limited, which plant has been described in the previously mentioned article by P. A. Butters in "Chemistry and Industry", Apr. 1967, Pages 613–615, see especially page 614, the second column.

In several cases, for example when the content of niobium is high in relation to the content of tantalum in the solution to be extracted, it may be recommendable to so select the extraction conditions (cf. especially FIG. 3) that a maximum transfer of both metals into the organic extract is obtained, whereupon the organic extract after separation from the aqueous solution is subjected to backwashing with a view to the removal of niobium from the extract. As previously mentioned such back-washing can suitably be performed by means of aqueous, dilute mineral acid such as dilute sulfuric acid, for example a 0.5M aqueous solution of sulfuric acid, in a manner similar to the procedure used inter alia in the afore-mentioned, known MIBK-process. If one assumes, as is reasonable, that the extraction mechanism can be illustrated by the following reaction scheme it will be seen that addition of sulfuric acid to the organic extract will force the reaction against the left side, and since the distribution coefficient for the niobium complex (i.e. the ratio between the solubility in organic phase and the solubility in aqueous acid phase) is substantially less than for the tantalum complex, niobium will be removed from the organic extract. If the conditions are such that by the back-washing or back-washings also an undesirable amount of tantalum is back-washed, renewed extraction by amine under conditions securing maximum separation (cf. FIG. 3), and, if so desired, back-washing can be performed. However, even under unfavorable ratio between tantalum and niobium in the original solution to be extracted, it has been possible to perform a substantial complete separation of tantalum and niobium in a single step or in quite a few steps.

From the final solutions containing tantalum and niobium, respectively, these elements can be isolated in known manner. Thus, the organic, tantalum-containing extract can be treated with an aqueous solution of alkali metal hydroxide, for example, a 5% solution of potassium hydroxide, whereby the tantalum compound will be dissolved in the hydroxide solution. By neutralization of this solution with an acid, preferably a mineral acid such as sulfuric acid, tantalic acid is precipitated, and this can be isolated and, if so desired, calcined (600°–800°C) so as to form tantalum pentoxide. This oxide can, if so desired, be converted in known manner into tantalum metal. The final solution containing niobium normally will be an aqueous, mineral acid-containing, preferably sulfuric acid-containing, solution. From this solution niobic acid can be precipitated by the neutralization with alkali such as potassium carbonate, and the precipitated niobic acid can be isolated and processed in the same manner as mentioned in connection with the tantalic acid.

The extractions and back-washings mentioned in the preceding text are preferably performed at or in the neighbourhood of usually room temprature. However, it is also possible to use somewhat lower or somewhat higher temperatures, but not a temperature above about 80°C in view of the instability of the hydrogen peroxide.

In the following examples a comparison has been made between the extraction procedure according to the invention and a similar procedure, but without the addition of fluoride ions (comparison example).

COMPARISON EXAMPLE

A mixture of 1 g niobium pentoxide and 0.1 g tantalum pentoxide is fused with 3 g sodium hydroxide. After the melt has been cooled, it is leached by means of water, and the precipitate is washed with water to remove any excess of sodium hydroxide. Then the washed material is neutralized with sulfuric acid and filtered. The filter cake consists of niobic and tantalic acids. These are treated, while heating to about 60°–70°C, with an aqueous solution of sulfuric acid, prepared by dissolving 3 ml concentrated sulfuric acid and 1.5 ml 30 vol% hydrogen peroxide in about 50 ml of water. By this treatment the niobic and tantalic acids are completely dissolved, and a clear and strongly yellow-colored solution is formed. This solution is diluted by means of water until 100 ml, and the solution obtained contains 0.08 mole Nb per liter, 0.0045 mole Ta per liter, 0.54 mole $H_2SO_4$ per liter and 0.16 mole $H_2O_2$ per liter.

This solution is poured into a separating funnel containing 100 ml of a 7.5 vol% solution of trioctylamine in Solvesso 100. The mixture is now shaken for one minute, and after separation of the phases the organic phase is shaken in the separating funnel with 50 ml of a 5 weight% solution of potassium hydroxide in water. By neutralization of the resulting potassium hydroxide solution with, for example, sulfuric acid to pH = 7, niobic and tantalic acids are precipitated, and they are then filtered and calcined so as to form niobium and tantalum pentoxides.

By analysis of the said sulfuric acid solution and potassium hydroxide solution after extraction it was found that only 4% niobium and non-measurable amounts of tantalum have been extracted.

EXAMPLE 1

The procedure is as in the comparison example, except that to the aqeous phase is added before the extraction 300 mg ammonium fluoride, corresponding to 0.081M $F^-$.

By analysis there was now found a distribution coefficient for tantalum ($D_{Ta}$) of 98, and for niobium ($D_{Nb}$) of 0.42. Accordingly, the separation factor is (98/0.42) = 233.

EXAMPLE 2

The procedure is the same as in the comparison example, except that the sulfuric acid concentration is adjusted to 1.8M, and the fluoride concentration to 0.05M.

The distribution coefficients obtained are: $D_{Ta} = 1.2$, and $D_{Nb} = 0.09$.

Separation factor = 13.

EXAMPLE 3

The procedure is the same as stated in example 2, except that the fluoride concentration is adjusted to 0.35M.

The distribution coefficients are: $D_{Ta} = 1.2$, and $D_{Nb} = 1.2$.

Separation factor = 1.

EXAMPLE 4

The procedure is the same as in the comparison example, except that the sulfuric acid concentration is adjusted to 1.8M, the fluoride concentration to 0.081M and the hydrogen peroxide concentration to 0.05M.

The distribution coefficients obtained are: $D_{Ta} = 0.8$, and $D_{Nb} = 0.1$.

Separation factor = 8.

EXAMPLE 5

The procedure is the same as in the comparison example, except that the sulfuric acid concentration is adjusted to 1.8M, the fluoride concentration to 0.081M, and the concentration of trioctylamine to 15 vol%.

The distribution coefficients are: $D_{Ta} = 2.1$, and $D_{Nb} = 0.31$.

Separation factor = 7.

Figure 6:
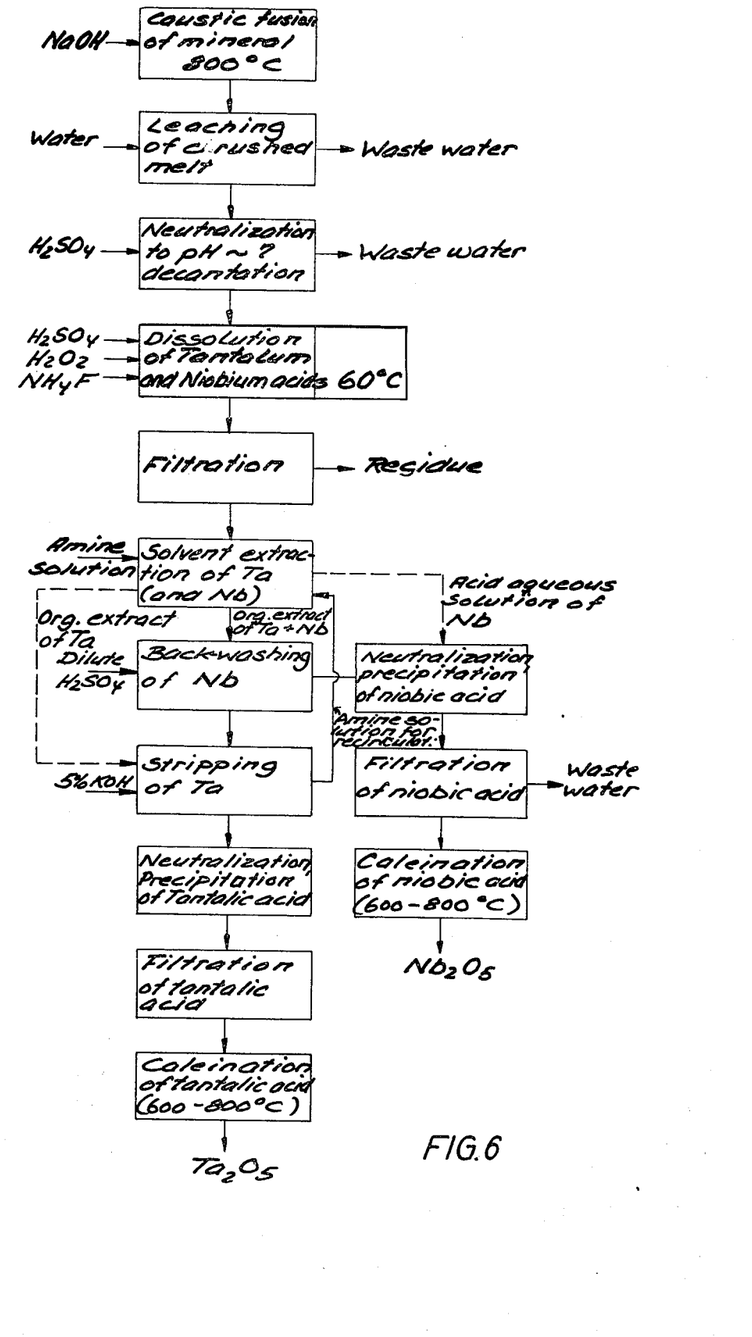

In FIG. 6 is shown diagrammatically by means of a flow sheet, how Ta and Nb can be recovered in practice from Ta- and Nb-containing minerals, such as pyrochlore and tantalite, by means of the process of the invention.

The crushed and ground mineral is first in known manner subjected to caustic fusion by means of alkali metal hydroxide, preferably sodium hydroxide which is possibly mixed with a minor amount of sodium carbonate. The ratio between mineral and alkali metal hydroxide can, by way of example, be in the range from 1:3 to 1:5, but these limits are in no way critical, because care should first and foremost be taken to secure that there is a certain excess of alkali metal hydroxide in relation to the amount which will be necessary for the decomposition of the mineral and solubilization of the silicate. The fusion is suitably performed at a temperature in the range from 600°–800°C or above and is preferably continued, until at least 90% decomposition of the silicate has been obtained, which point may be determined in advance by analysis. Normally such fusions can be performed within a period of 1–2 hours. The fusion can be performed in any suitable melting-furnace, for example a crucible furnace.

After purging off the melt from the melting-furnace, and cooling of the melt, the cooled melt is crushed and ground to a powder, for example in an edge-runner and is then subjected to leaching by means of water, until excess of alkali and soluble silicate (and possibly other soluble compounds such as soluble tin compounds) have been substantially removed. This leaching can take place in a conventional, continuous or discontinuous leaching or extracting apparatus. The product leached in this way is neutralized by means of dilute sulfuric acid to a pH-value of approximately 7, whereby the niobate and tantalate ae converted into hydrated niobium and tantalum oxide.

After decanting off the neutral liquid from the solid substances containing the said oxides, said substances are dissolved in a mixture of sulfuric acid and hydrogen peroxide of the desired concentrations (cf. the information given in the preceding text), while heating to a temperature of about 60°C. At this place it is also possible to add the predetermined amount of fluoride ion, for example, in the form of ammonium fluoride. However, fluoride ions can just as well be added after the undissolved residues have been filtered off. Like all the other processes, neutralization, decantation, dissolution and filtration can be performed in conventional apparatus.

The solution resulting from the filtration is clear and yellow-brown. It is then subjected to the mentioned extraction of tantalum and niobium by means of an amine. The extraction is performed in conventional extraction apparatus and according to the principles described in further detail in the preceding text. In the flow sheet shown in FIG. 6 is in general outline and by way of examples shown, how the steps in the extraction procedure are, according to whether it is so performed that in the first extraction tantalum as well as niobium are extracted in maximum amount, whereupon a separation is performed by means of back-washing of niobium, or it is so performed that in the first step tantalum is practically exclusively extracted. In the latter instance the passage from the first extraction to the following treating step is indicated by dotted lines.

The solution of organic amine remaining after removal of tantalum may, if necessary after saturation with sulfuric acid, be used again in the extraction procedure as is per se well-known.

As previously intimated the various treating steps can, as required, be modified in various ways, for example, by performing some of the treatments in several steps, by repeating a certain sequence of the treatments, etc. Furthermore, it should be underlined that the extraction may aim at the recovery and utilization of only one of the said two metals, Ta and Nb, especially in those cases in which the other metal is only present in the starting material in amounts, which are too small for economic recovery.

By performing an extraction procedure as the one described on sulfuric acid-containing solutions originating in the mineral pyrochlore, a $Nb_2O_5$ product of more than 99% purity has been obtained by an extraction in one single step. By a similar extraction in one single step of solutions originating in the mineral tantalite $Ta_2O_5$-products of a purity of more than 99% have similarly been obtained. The impurities of Al, Ca, Mg, Sb, Si and W in such $Ta_2O_5$-products have been less than 50 ppm, while the contents of Fe and Sn have been about or somewhat more than 100 ppm. The content of Nb has been about or a little more than 0.3%.

In the mineral acid-containing solutions which have hitherto in practice been subjected to extraction with amines in accordance with the process of the invention, the total concentration of tantalum and niobium has been about 30–60 g/liter.

What I claim is:

1. A process for the recovery of at least one of the metals tantalum and niobium from an aqueous mineral acid-containing, preferably sulfuric acid-containing, solution containing such metals, by extraction in at least one step by means of an amine, preferably an amine selected from secondary and tertiary, long-chained alkyl amines, in the presence of hydrogen peroxide, and isolating the metal from the organic extract, said process being characterized by the fact that the extraction of the acid, hydrogen peroxide-containing solution by means of an amine is performed in the presence of fluoride ions.

2. A process as claimed in claim 1 characterized in that the acid concentration in the solution to be extracted is kept below 10N and preferably in the range from 0.2N to 4N.

3. A process as claimed in claim 2 characterized in that the concentration of acid in the solution is kept in the range from 0.4N to 2N.

4. A process as claimed in claim 1 characterized in that the proportion of hydrogen peroxide incorporated into thesolution to be extracted is at least approximately equal to the proportion which will be necessary for the conversion of Ta- and Nb-compounds present into complexes containing one molecule of $H_2O_2$ for each Ta- and Nb-atom.

5. A process as claimed in claim 1 characterized in that a proportion of fluoride ions is incorporated into the solution to be extracted, which does not substantially exceed the proportion, at which — at the extraction conditions used — a maximum extraction of tantalum as well as niobium is otained.

6. A process as claimed in claim 1 characterized in that a concentration of fluoride ions is used, at which a substantially maximum extraction of tantalum is obtained simultaneously with a substantially less than maximum extraction of niobium.

7. A process as claimed in claim 1 characterized in that the fluoride ions are incorporated in the form of a salt soluble in the solution to be extracted.

8. A process as claimed in claim 7 characterized in that the said salt is selected from the group consisting of ammonium fluoride, potassium fluoride and sodium fluoride.

* * * * *